United States Patent
Bartlett et al.

(10) Patent No.: US 7,166,675 B2
(45) Date of Patent: Jan. 23, 2007

(54) LOW GLOSS POWDER COATING COMPOSITION

(75) Inventors: Kristin M. Bartlett, Pittsburgh, PA (US); Simion Coca, Pittsburgh, PA (US); Anthony M. Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 262 days.

(21) Appl. No.: 10/769,148

(22) Filed: Jan. 30, 2004

(65) Prior Publication Data

US 2004/0186242 A1    Sep. 23, 2004

Related U.S. Application Data

(60) Provisional application No. 60/444,950, filed on Feb. 4, 2003.

(51) Int. Cl.
*C08L 35/00* (2006.01)

(52) U.S. Cl. ............ 525/207; 525/107; 525/166; 525/187; 525/194; 525/216; 525/227; 525/228

(58) Field of Classification Search ........ 525/107, 525/166, 187, 194, 207, 216, 227, 228
See application file for complete search history.

(56) References Cited

U.S. PATENT DOCUMENTS

| | | | |
|---|---|---|---|
| 4,147,679 A | | 4/1979 | Scriven et al. |
| 4,220,679 A | | 9/1980 | Backhouse |
| 4,403,003 A | | 9/1983 | Backhouse |
| 5,071,904 A | | 12/1991 | Martin et al. |
| 5,141,993 A | * | 8/1992 | Siol et al. .......... 525/154 |
| 5,380,801 A | * | 1/1995 | Fischer et al. ...... 525/132 |
| 5,446,095 A | * | 8/1995 | Siol et al. .......... 525/93 |
| 6,093,774 A | * | 7/2000 | Dumain ............ 525/207 |
| 6,479,585 B1 | * | 11/2002 | Hart et al. ......... 525/119 |
| 6,875,808 B1 | * | 4/2005 | Weier et al. ....... 524/504 |
| 6,914,103 B1 | * | 7/2005 | Tullos et al. ....... 525/530 |

OTHER PUBLICATIONS

Lohse, D.J., "Polyolefin Blend Miscibility," *Polymer Preprints*, 2001, pp. 259-260, vol. 42, No. 1.
Greenley, Robert Z., "Q and e Values for Free Radical Copolymerizations of Vinyl Monomers and Telogens," *Polymer Handbook*, Fourth Edition, Ed. J. Brandrup, E.H. Immergut, and E.A. Grulke, 1999, pp. 309-319, John Wiley & Sons, Inc., New York.
Rzaev, Zakir M.O. et al., "Complex-Radical Copolymerization of 2,4,4-Trimethylpentene-1 with Maleic Anhydride," *Eur. Polym. J.*, 1998, pp. 981-985, vol. 34, No. 7.
Nicolaides, David, *Parameterisation for Mesoscale Modelling II*, Molecular Simulations, Inc., San Diego.
*Polymer User Guide, Part 1, Release 4.0.0*, Sep. 1996, pp. 3-23, 3-24, 8-3 to 8-9, Molecular Simulations, Inc., San Diego.
Flory, Paul J., "Statistical Thermodynamics of Polymer Solutions," *Principles of Polymer Chemistry*, 1953, pp. 495-540, Cornell University Press, Ithaca, New York.
Flory, Paul J., "Phase Equilibria in Polymer Systems," *Principles of Polymer Chemistry*, 1953, pp. 541-594, Cornell University Press, Ithaca, New York.

* cited by examiner

*Primary Examiner*—Bernard Lipman
(74) *Attorney, Agent, or Firm*—Carol A. Marmo; Deborah M. Altman

(57) ABSTRACT

A thermosetting protective and/or decorative coating composition that includes a co-reactable solid, particulate mixture of a film-forming material that includes a copolymer containing functional groups and a crosslinking agent having at least two functional groups that are reactive with the functional groups in the copolymer. The film-forming material makes up from 20 to 95 wt. % and the crosslinking agent makes up from 5 to 80 wt. % of the composition. The composition is applied as a coating and cured, forming a bicontinuous morphology where the film-forming material and the crosslinking agent form separate phases resulting in a low gloss coating as indicated by a specular gloss measurement of not more than 10 gloss units measured at 60° with an appropriate instrument. A method of coating a substrate using the composition, substrates coated using the method, and a multi-component composite coating composition that includes the composition are disclosed.

38 Claims, 1 Drawing Sheet

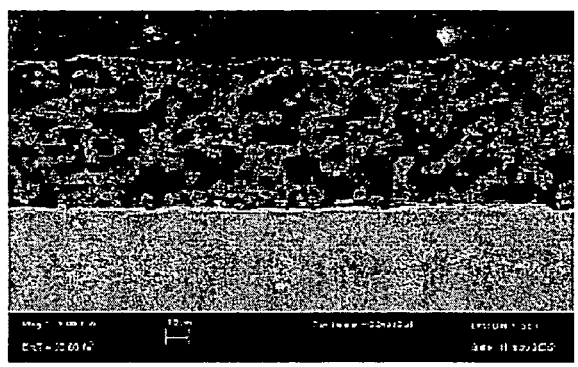
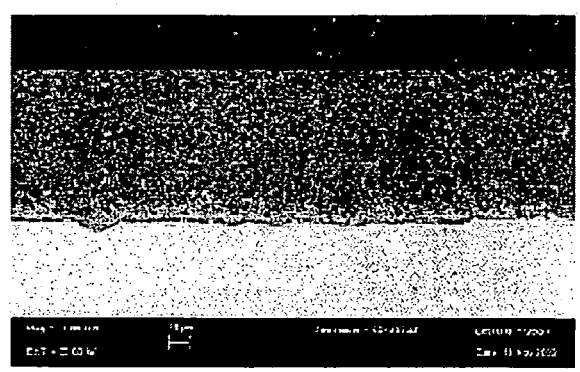
FIG. 1
FIG. 2
(Prior Art)

LOW GLOSS POWDER COATING COMPOSITION

CROSS-REFERENCE TO RELATED APPLICATION

This application claims priority under 35 U.S.C. § 119 to Provisional Application Ser. No. 60/444,950, filed Feb. 4, 2003.

BACKGROUND OF THE INVENTION

1. Field of the Invention

The present invention relates generally to thermosetting compositions that contain copolymers of vinyl monomers. More specifically, the present invention is directed to a co-reactable solid particulate mixture thermosetting composition that includes functional copolymers containing isobutylene type monomers.

2. Description of Related Art

Reducing the environmental impact of coating compositions, in particular that associated with emissions into the air of volatile organics during their use, has been an area of ongoing investigation and development in recent years. Accordingly, interest in powder coatings has been increasingly due, in part, to their inherently low volatile organic content (VOC), which significantly reduces air emissions during the application-process. While both thermoplastic and thermoset coating compositions are commercially available, thermoset coatings are typically more desirable because of their superior physical properties, e.g., hardness and solvent resistance.

Low VOC coatings are particularly desirable in the automotive original equipment manufacture (OEM) market due to the relatively large volume of coatings that are used. However, in addition to the requirement of low VOC levels, automotive manufacturers have very strict performance requirements of the coatings that are used. For example, automotive OEM clear top coats are typically required to have a combination of good-exterior durability, acid etch and water spot resistance, and excellent gloss and appearance. While liquid top coats containing, for example, capped polyisocyanate and polyol components can provide such properties, they have the undesirable drawback of higher VOC levels relative to powder coatings that have essentially zero VOC levels.

Solid particulate coating formulations referred to in the industry as "powder coatings" are finding increasing use in painting metal substrates, both as primer coatings and as top or clear coats of the base coat and clear coat composite coatings. The automotive industry provides corrosion protection and decorative appearance for motor vehicles by multi-layered paint composites on the various types of surfaces of motor vehicles. The finishing layers of this composite usually include the popular base coat/clear coat composites. The base coat is a pigmented layer and the clear coat is a non-pigmented or only slightly pigmented layer that is applied separately to the base coat and cured to some degree with the base coat. To provide improved coating composites for motor vehicles, the industry is seeking solutions to the problem of blemishes, smudges, and coating imperfections that occur due to the action of road dirt and debris that may strike areas of the vehicle. These strikes can result in unaesthetic marring of the clear coat. Mar resistance is the property of a coating film that enables the film to remain unimpaired by light abrasion, impact or pressure.

While the aforementioned powder coatings provide an acceptable coating with a highly shined or glossy appearance, they are not appropriate for all applications. In fact, in many applications where powder coatings could be advantageously used, they are not because an acceptable low gloss powder coating is not available.

It would be desirable to develop thermosetting "powder coating" compositions that provide an excellent coating with a low gloss finish.

SUMMARY OF THE INVENTION

The present invention is directed to a thermosetting protective and/or decorative coating composition that includes a co-reactable solid, particulate mixture of a film-forming material that includes a copolymer containing functional groups and a crosslinking agent having at least two functional groups that are reactive with the functional groups in the copolymer. The film-forming material makes up from 20 to 95 wt. % and the crosslinking agent makes up at least from 5 to 80 wt. % of the combined weights of the film-forming material and the crosslinking agent. When the present thermosetting composition is cured, it forms a bicontinuous morphology where the film-forming material and the crosslinking agent form separate phases. A cured coating layer deposited from the thermosetting composition, coated over a substrate, exhibits low gloss as indicated by a specular gloss measurement of not more than 10 gloss units when measured at 60° with a Byk-Gardner Haze-gloss Reflectometer.

The present invention is also directed to a method of-coating a substrate including applying the above-described thermosetting composition to the substrate, coalescing the thermosetting composition to form a substantially continuous thin film, and curing the thermosetting composition. The present invention is additionally directed to substrates coated using the method.

The present invention is further directed to a multi-component composite coating composition that includes a base coat deposited from a pigmented film-forming composition, and a transparent top-coat applied over the base coat, where either the base coat, the transparent top coat, or both, are deposited from the above-described thermosetting composition. The present invention is additionally directed to substrates coated by the multi-component composite coating composition.

BRIEF DESCRIPTION OF THE DRAWINGS

FIG. 1 is a picture from a scanning electron microscope showing a cross-section of a low-gloss coating of the present invention; and FIG. 2 is a picture from a scanning electron microscope showing a cross section of a conventional coating.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

As used herein, the term "copolymer composition" is meant to include a synthesized copolymer, as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

As used herein and in the claims, the term "low gloss" generally refers to a surface that does not have a shiny or reflective finish. Typically, as is known in the art, gloss is measured using an appropriate instrument at a given angle, often 60°. Appropriate instruments for measuring gloss include, but are not limited to, the Novo Gloss Statistical Glossmeter available from Rhopoint Instrumentation Ltd., East-Sussex, U.K. and the Haze-gloss Reflectometer available from BYK-Gardner USA, Columbia, Md. The precise gloss measurement that may be considered "low gloss" will depend on the intended use of a coated substrate. "Low gloss" may be indicated by a 60° gloss measurement of up to 70 gloss units, in some cases up to 60 gloss units, in other cases up to 50 gloss units, in some situations up to 40 gloss units, in other situations up to 30 gloss units, and some instances up to 20 gloss units.

As used herein and in the claims, the term "thin film" refers to a film having a dry film thickness of less than 1000 microns, typically less than 800 microns, usually within the range of 10 to 700 microns, and more usually within the range of 25 to 600 microns.

As used herein and in the claims, the term "bicontinuous morphology" refers to two or more materials existing in separate phases, where the phases are uniformly intermingled within a film. A bicontinuous morphology is distinguished by two or more intermingled networks of ordinarily immiscible substances, in which macroscopic phase separation is prevented. In an embodiment of the present invention, macroscopic phase separation is prevented by curing the present thermosetting composition, thus providing chemical linkages between the two components. In other words, the present bicontinuous morphology is a meta-stable thermodynamic state frozen in place by crosslinking.

As used herein and in the claims, the terms "interaction parameter" and "$\chi$" refer to the dimensionless quantity which characterizes the interaction energy between a polymer molecule and a solvent or another polymer molecule (Flory, *Principles of Polymer Chemistry*, Cornell University Press (1953) pp. 507–511 and 541–545). The interaction parameter may be measured directly by small angle neutron scattering (Lohse, *Polymer Preprints*, 2001, 42(1), p. 259).

As used herein and in the claims, the terms "solubility parameter" and "$\delta$" refer to the Hildebrand solubility parameter or, as it may be referred to in polymeric systems, the cohesion parameter. Solubility parameters are determined for polymeric systems in a number of ways, non-limiting examples of which include the swelling behavior of polymers in a solvent, and cloud-point determinations in which a resin is dissolved in a true solvent and titrated with another solvent until the mixture becomes cloudy, thus identifying the range of solubility. Testing cloud-points with a variety of solvents and diluents enable a precise determination of cohesion parameter values for polymers. Other methods include, but are not limited to, a combination of empirical tests, such as cloud-point and solubility/swelling tests, with the addition of theoretical calculations based on comparing chemical structure to other materials of known solubility parameter values. The solubility parameter is typically expressed in the square root of Joules per cubic centimeter ($(J/cm^3)^{1/2}$)

The present invention is directed to a thermosetting composition that includes a co-reactable solid, particulate mixture of a film-forming material that includes a copolymer containing functional groups and a crosslinking agent having at least two functional groups that are reactive with the functional groups in the copolymer. In the present invention, the solubility parameter of the film-forming material is sufficiently different from the solubility parameter of the crosslinking agent that the resulting thermodynamic interaction parameter value ($\chi$) for the admixture of the film-forming-material and the crosslinking agent is typically 0.5 or greater. Thus, in the present thermosetting composition, the film-forming material and the crosslinking agent are immiscible with each other and form a bicontinuous morphology, in which macroscopic phase separation is prevented by curing the thermosetting composition.

More specifically, the "free energy of mixing" is defined as $\Delta G = \Delta H - T\Delta S$, where G is the Gibb's free energy, H is enthalpy, S is entropy, and T is temperature. Simply put, when the free energy of mixing ($\Delta G$) of two components is a positive value, the two components are immiscible and will phase separate, for example, in the instance where a coating composition contains two substantially immiscible components, when applied as a coating layer the components separate into their distinct phases and form a bicontinuous morphology in the bulk. Also, $\Delta G$ for a binary mixture containing a component 1 and a component 2 may be defined by the following equation:

$$\Delta G = RT[(n_1 \ln X_1 + n_2 \ln X_2) + \chi n_1 X_2]$$

where R is the gas constant, T is temperature, X is the volume fraction of component 1 or 2, n is the number of particles, and $\chi$ ("chi") represents the thermodynamic interaction parameter as indicated above. The thermodynamic interaction parameter ($\chi$ or "chi") is defined as the difference in the energy of mixing of components 1 and 2. This can be represented by the following equation:

$$\chi = (\Delta E_{mix}/RT)V_m$$

where $V_m$ is the average molar volume ("reference segment volume") and R and T are defined above. "Chi" may also be defined as the difference in solubility parameter ($\delta$) of two materials as follows:

$$\chi = V_m(\delta_1 - \delta_2)^2/RT$$

where $\delta$ is the Hildebrand solubility parameter. The solubility parameter may be computed from a value known as the cohesive energy density ("ced") of a material. The "ced" is related to the heat of vaporization of a material, that is, how much energy is required to remove a single molecule from the bulk. For polymeric systems, such as a coating composition, where the assumption that the entropy of mixing is exceedingly small, the free energy expressions reduce to the energy of mixing itself, that is $\Delta G = \Delta H$, and a theoretical critical point exists where two materials become immiscible (phase separate) when "chi" is greater than 0.5. For regular solutions (i.e., of low molecular weight species), this critical point has a value of 2.0.

To summarize, from first principles, the "ced" for a bulk material can be computed. The "ced" is directly related to the solubility parameter (δ) as indicated above. The thermodynamic interaction parameter "chi" (χ) can be computed from the differences in the solubility parameter (δ) for each of the two materials. "Chi," along with relative fractions of materials in a mixture, may be used to compute the free energy of mixing (ΔG). If ΔG is a positive value, the mixture is thermodynamically unstable and phase separation will occur. Critical points for this condition are values of "chi" equal to 0.5 and greater for higher molecular weight materials, such as the polymeric components of a resinous binder system, and 2.0 for smaller molecules. Thus, the formation of a bicontinuous morphology results from balancing the solubility parameter (δ), the thermodynamic interaction parameter (χ), the volume fraction of each component (φ), and the molecular weight of each component. (Flory, Paul J., *Principles of Polymer Chemistry*, Cornell University Press (1953), Chapters XII and XIII; *Polymer User Guide*, September 1996, Molecular Simulations, Inc., San Diego, Calif.; Nicolaides, D., *Parameterisation for Mesoscale Modeling*, Molecular Simulations, Inc.)

Without intending to be bound by any theory, it is believed that by the phase separation discussed above, the film-forming material and crosslinking agent form two phases resulting in the formation of a bicontinuous morphology that is "locked" in place when the thermosetting composition is cured, resulting in a low gloss coating layer.

In the present invention, typically the thermodynamic interaction parameter "chi" (χ) of the copolymer in the film-forming material with the crosslinking agent is greater than 0.5. Additionally, in the present invention, typically the difference between the solubility parameter, $\delta_a$, of the copolymer in (a) and the solubility parameter, $\delta_b$, of the crosslinking agent (b) ($\delta_a - \delta_b$) is greater than 2.

Generally, the film-forming material and the crosslinking agent will be present in the thermosetting composition at a level that will result in the formation of a bicontinuous morphology. Typically, the film-forming material is present in the thermosetting composition at a level of at least 20 wt. %, in some cases at least 25 wt. %, in other cases at least 30 wt. %, and in some situations at least 40 wt. % and at levels of up to 95 wt. %, in some cases up to 90 wt. %, in other cases 80 wt. %, in some situations-up to 70 wt. %, and in other situations up to 60 wt. % based on the combined weights of the film-forming material and the crosslinking agent. The film-forming material may be present at any level or between any levels indicated above. Additionally, the crosslinking agent is present in the thermosetting composition at a level of at least 5 wt. %, in some cases at least 10 wt. %, in other cases at least 20 wt. %, in some situations at least 30 wt. %, and in other situations at least 40 wt. % and at levels of up to 80 wt. %, in some cases up to 75 wt. %, in other cases up to 70 wt. %, and in some situations up to 60 wt. % based on the combined weights of the film-forming material and the crosslinking agent. The crosslinking agent may be present at any level or between any levels indicated above.

As used herein and in the claims, the term "film-forming material" refers to a material that by itself or in combination with a coreactive material, such as a crosslinking agent, is capable of forming a continuous film on a surface of a substrate. In the present invention, the film-forming material includes a copolymer having functional groups. The crosslinking agent includes a material having at least two functional groups that are reactive with the functional groups in the copolymer.

The film-forming material will typically include a Copolymer. The copolymer of the film-forming material typically has a molecular weight of at least 250, in many cases at least 500, typically at least 1,000, and, in some cases, at least 2,000. The present copolymer may have a molecular weight of up to 1,000,000, in many cases up to 500,000, typically up to 100,000, and, in some cases, up to 50,000. Certain applications will require that the molecular weight of the present copolymer not exceed 30,000, in some cases not exceed 25,000, in other cases not exceed 20,000, and, in certain instances, not exceed 16,000. The molecular weight of the copolymer is selected based on the potential to form a bicontinuous morphology in coatings formed from the thermosetting composition. The molecular weight of the copolymer may vary in any range of values inclusive of those stated above.

The polydispersity index (PDI) of the present copolymer is not always critical. The polydispersity index of the copolymer is usually less than 6, in many cases less than 5, typically less than 3, and, in some cases, less than 2.5. As used herein and in the claims, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

The crosslinking agent of the present thermosetting composition may also include a polymer. The polymer of the crosslinking agent may have a molecular weight of at least 200, in many cases at least 500, typically at least 1,000, and, in some cases, at least 2,000. The polymer of the crosslinking agent may have a molecular weight of up to 1,000,000, in many cases up to 500,000, typically up to 100,00.0, and, in some cases, up to 50,000. Certain applications will require that the molecular weight of the polymer of the crosslinking agent not exceed 30,000, in some cases not exceed 25,000, in other cases not exceed 20,000, and, in certain instances, not exceed 16,000. The molecular weight of the polymer of the crosslinking agent is selected based on the potential to form a bicontinuous morphology in coatings formed from the thermosetting composition. The molecular weight of the polymer of the crosslinking agent may vary in any range of values inclusive of those stated above.

The polydispersity index (PDI) of the polymer of the crosslinking agent is not always critical. The polydispersity index is usually less than 4, in many cases less than 3.5, typically less than 3, and, in some cases, less than 2.5.

In an embodiment of the present invention, the gloss of a coating layer deposited on a surface of a substrate from the present thermosetting composition may be controlled by further including one or more other polymers containing functional groups in-the film-forming material. In a further embodiment, the other polymers may be miscible with the crosslinking agent and reside in the crosslinking agent phase in the above-described bicontinuous morphology.

In an embodiment of the present invention, the other polymers in the film-forming material may include, but are not limited to, homopolymers and copolymers having functional groups selected from polyacrylates, polymethacrylates, polyesters, polyamides, polyethers, polysilanes, and polysiloxanes. The functional groups contained in the other polymers will typically be those described in relation to the film-forming material as described below.

In an embodiment of the present invention, the copolymer in the film-forming material is a copolymer composition that contains a functional group-containing copolymer having at least 30 mol %, in many cases at least 40 mol %, typically at least 50 mol %, in some cases at least 60 mol %, and in other cases at least 75 mol % of residues of the copolymer derived from alternating sequences of donor monomer—acceptor monomer pairs having the alternating monomer residue units of structure:

-[DM-AM]- where DM represents a residue from a donor monomer and AM represents a residue from an acceptor monomer, typically, one or more acrylic acceptor monomers.

The terms "donor monomer" and "acceptor monomer" are used throughout this application. With regard to the present invention, the term "donor monomer" refers to monomers that have a polymerizable, ethylenically unsaturated group that has relatively high electron density in the ethylenic double bond, and the term "acceptor monomer" refers to monomers that have a polymerizable, ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable, ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of −1.80.

As referred to herein, a strong acceptor monomer is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

The copolymer may be a 100% alternating copolymer of DM and AM. More particularly, at least 15 mol % of the copolymer comprises a donor monomer, which is an isobutylene-type monomer, having the following structure (I):

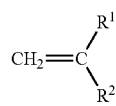

where $R^1$ is linear or branched $C_1$ to $C_4$ alkyl; $R^2$ is one or more of methyl, linear, cyclic, or branched $C_1$ to $C_{20}$ alkyl, alkenyl, aryl, alkaryl, and aralkyl. Further, at least 15 mol % of the copolymer includes an acrylic monomer as an acceptor monomer. The group $R^2$ may include one or more functional groups selected from epoxy, carboxylic acid, hydroxy, amide, oxazoline, isocyanate, capped isocyanate, amine, thiol, aceto acetate, methylol, methylol ether, and beta-hydroxyalkylamide.

Of note in the present copolymer in the film-forming material, the copolymer incorporates a substantial portion of alternating residues of a mild donor monomer as described by structure I and a mild acceptor monomer, which is an acrylic monomer. A non-limiting list of published e values for monomers that may be included as monomers described by structure I and acrylic monomers of the present invention are shown in Table 2.

TABLE 2

| Alfrey-Price e values for Selected Monomers | |
|---|---|
| Monomer | e value |
| Monomers of structure 1 | |
| Isobutylene | −1.20[1] |
| Diisobutylene | 0.49[2] |
| Acrylic Monomers | |
| Acrylic Acid | 0.88[1] |
| Acrylamide | 0.54[1] |
| Acrylonitrile | 1.23[1] |
| Methyl Acrylate | 0.64[1] |
| Ethyl Acrylate | 0.55[1] |
| Butyl Acrylate | 0.85[1] |
| Benzyl acrylate | 1.13[1] |
| Glycidyl acrylate | 1.28[1] |

[1]Polymer Handbook, Fourth Edition (1999)
[2]Rzaev et al., Eur. Polym. J., Vol. 24, No. 7, pp. 981–985 (1998)

Any suitable donor monomer may be used in the present invention. Suitable donor monomers that may be used include strong donor monomers and mild donor monomers. Suitable donor monomers include, but are not limited to, isobutylene, diisobutylene, isoprene, dipentene, 1-octene, and mixtures thereof. The present invention is particularly useful for preparing alternating copolymers where a mild donor monomer is used. The present copolymers will include a mild donor monomer described by structure I, such as isobutylene, diisobutylene, dipentene, 1-octene, and isoprenol, and may additionally include other suitable mild donor monomers. The mild donor monomer of structure I is present in the copolymer composition at a level of at least 15 mol. %, in some cases at least 25 mol %, typically at least 30 mol %, and in some cases at least 35 mol %. The mild donor monomer of structure I is present in the copolymer composition at a level of up to 50 mol %, in some cases up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure I may be present in the copolymer composition in any range of values inclusive of those stated above.

Suitable other donor monomers that may be used in the present invention include, but are not limited to, ethylene, butene, styrene, substituted styrenes, methyl styrene, vinyl ethers, vinyl esters, vinyl pyridines, divinyl benzene, vinyl naphthalene, and divinyl naphthalene. Vinyl esters include vinyl esters of carboxylic acids that include, but are not limited to, vinyl acetate, vinyl butyrate, vinyl 3,4-dimethoxybenzoate, and vinyl benzoate. The use of other donor monomers is optional; when other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol %, in some cases up to 20 mol %, typically up to 10 mol %, and, in some cases, up to 5 mol %. The level of other donor monomers used is determined by the properties that are to be incorporated into the copolymer composition. Residues from the other donor monomers may be present in the copolymer composition in any range of values inclusive of those stated above.

The copolymer composition includes acceptor monomers as part of the alternating donor monomer—acceptor monomer units along the copolymer chain. Any suitable acceptor monomer may be used. Suitable acceptor monomers include strong acceptor monomers and mild acceptor monomers. A non-limiting class of suitable acceptor monomers are those described by the structure (II):

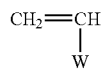
(II)

where W is selected from the group consisting of —CN, —X, and —C(=O)—Y, wherein Y is selected from the group consisting of —NR$^3_2$, —O—R$^5$—O—C(=O)—NR$^3_2$, and —OR$^4$; R$^3$ is selected from the group consisting of H, linear or branched C$_1$ to C$_{20}$ alkyl, and linear or branched C$_1$ to C$_{20}$ alkylol; R$^4$ is selected from the group consisting of H, poly(ethylene oxide), poly(propylene oxide), linear or branched C$_1$ to C$_{20}$ alkyl, alkylol, aryl and aralkyl, linear or branched C$_1$ to C$_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical; R$^5$ is a divalent linear or branched C$_1$ to C$_{20}$ alkyl linking group; and X is a halide.

A class of mild acceptor monomers that are included in the present copolymer composition are acrylic acceptor monomers. Suitable acrylic acceptor monomers include those described by structure (III):

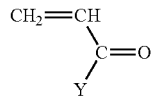
(III)

where Y is selected from —NR$^3_2$, —O—R$^5$—O—C(=O)—NR$^3_2$, and —OR$^4$; R$^3$ is selected from H, linear or branched C$_1$ to C$_{20}$ alkyl, and linear or branched C$_1$ to C$_{20}$ alkyl, aryl, and aralkyl containing one or more functional groups selected from epoxy, carboxylic acid, hydroxy, amide, oxazoline, isocyanate, capped isocyanate, carbamate, amine, thiol, aceto acetate, methylol, methylol ether and beta-hydroxyalkylamide; R$^4$ is selected from H, linear or branched C$_1$ to C$_{20}$ alkyl, aryl, and aralkyl containing one or more functional groups selected from epoxy, carboxylic acid, hydroxy, amide, oxazoline, isocyanate, capped isocyanate, carbamate, amine, thiol, aceto acetate, methylol, methylol ether, and beta-hydroxyalkylamide; and R$^5$ is a divalent linear or branched C$_1$ to C$_{20}$ alkyl linking group.

The acrylic acceptor monomers of structure III are present in the copolymer composition at a level of at least 15 mol %, in some cases at least 25 mol %, typically at least 30 mol %, and, in some cases, at least 35 mol %. The acrylic acceptor monomers of structure III are present in the copolymer composition at a level of up to 50 mol %, in some cases up to 47.5 mol %, typically up to 45 mol %, and, in some cases, up to 40 mol %. The level of the acrylic acceptor monomers of structure III used is determined by the properties that are to be incorporated into the copolymer composition. Residues from the acrylic acceptor monomers of structure III may be present in the copolymer composition in any range of values inclusive of those stated above.

Suitable other mild acceptor monomers that may be used in the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. The use of other mild acceptor monomers is optional; when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

In an embodiment of the present thermosetting, composition, the acrylic acceptor monomers include one or more selected from hydroxyethyl acrylate, hydroxypropyl acrylate, acrylic acid, dimethylaminoethyl acrylate, acrylamide, glycidyl acrylate, glycidyl methacrylate, n-butoxy methyl acrylamide, hydroxyethyl methacrylate, hydroxypropyl methacrylate, methacrylic acid, methacrylamide, 2-carbamoyloxyethyl acrylate, 2-carbamoyloxyethyl methacrylate, 2-carbamyloyloxypropryl acrylate, 2-carbamyloyloxypropryl methacrylate, 2-isocyanatoethyl acrylate, 2-isdcyanatoethyl methacrylate, 2-isocyanatopropyl acrylate, 2-isocyanatopropyl methacrylate, 2-oxazoline ethyl acrylate, 2-oxazoline ethyl methacrylate, 2-oxazoline propyl acrylate, 2-oxazoline propyl methacrylate, aceto acetate ester of hydroxyethyl acrylate, aceto acetate ester of hydroxyethyl methacrylate, aceto acetate ester of hydroxypropyl methacrylate, and aceto acetate ester of hydroxypropyl acrylate.

The copolymer of the film-forming material of the present invention may have all of the incorporated monomer residues in an alternating architecture. A non-limiting, example of a copolymer segment having 100% alternating architecture of diisobutylene (DIIB) and an acrylic acid (AA) is shown by structure IV:

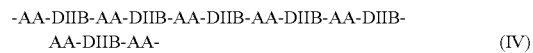
(IV)

However, in most instances, the copolymer will contain alternating segments and random segments as shown by structure V, a copolymer of DIIB, AA, and other monomers, M:

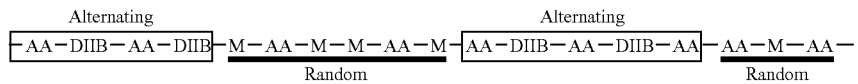

Structure V shows an embodiment of the present invention where the copolymer may include alternating segments, as shown in the boxes, and random segments, as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure V.

The other ethylenically unsaturated monomers include any suitable monomer not traditionally categorized as being an acceptor monomer or a donor monomer.

The other ethylenically unsaturated monomer, residue of monomer M of structure V, is derived from at least one ethylenically unsaturated, radically polymerizable monomer. As used herein and in the claims, "ethylenically unsaturated, radically polymerizable monomer" and like terms are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to, monomer residues derived from monomers of the general formula VI:

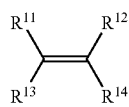

(VI)

where $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl, and phenyl; and $R_{13}$ is selected from the group consisting of H, $C_1$–$C_6$ alkyl, $COOR^{15}$, wherein $R^{15}$ is selected from the group consisting of H, an alkali metal, a $C_1$ to $C_6$ alkyl group, glycidyl, and aryl.

Specific examples of other monomers, M, that may be used in the present invention include methacrylic monomers and allylic monomers. Residue of monomer M may be derived from at least one of alkyl methacrylate having from 1 to 20 carbon atoms in the alkyl group. Specific examples of alkyl methacrylates having from 1 to 20 carbon atoms in the alkyl group from which residue of monomer M may be derived include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, as well as functional methacrylates, such as hydroxyalkyl methacrylates, oxirane functional methacrylates, and carboxylic acid functional methacrylates, such as methacrylic acid.

Residue of monomer M may also be selected from monomers having more than one methacrylate group, for example, methacrylic anhydride and diethyleneglycol bis (methacrylate).

As used herein and in the claims, by "allylic monomer(s)" what is meant is monomers containing substituted and/or unsubstituted allylic functionality, i.e., one or more radicals represented by the following general formula VII,

(VII)

where $R^{10}$ is hydrogen, halogen, or a $C_1$ to $C_4$ alkyl group. Most commonly, $R^{10}$ is hydrogen or methyl and, consequently, general formula VII represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

The present copolymer composition is prepared by a method including the steps of (a) providing a donor monomer composition comprising one or more donor monomers of structure I; (b) mixing an ethylenically unsaturated monomer composition comprising one or more acceptor monomers with (a) to form a total monomer composition; and (c) polymerizing the total monomer composition in the presence of a free radical initiator. In an embodiment of the present invention, the ethylenically unsaturated monomer composition includes monomers of structure III.

In an embodiment of the present method, the monomer of structure I is present at a molar excess based on the amount of acrylic acceptor monomer. Any amount of excess monomer of structure I may be used in the present invention in order to encourage the formation of the desired alternating architecture. The excess amount of monomer of structure I may be at least 10 mol %, in some cases up to 25 mol %, typically up to 50 mol %, and, in some cases, up to 100 mol % based on the amount of acrylic acceptor monomer. When the molar excess of monomer of structure I is too high, the process may not be economical on a commercial scale.

In a further embodiment of the present method, the acrylic acceptor monomer is present in an amount of at least 15 mol %, in some cases 17.5 mol %, typically at least 20 mol. %, and, in some cases, 25 mol % of the total monomer composition. The acrylic acceptor monomer may further be present in an amount up to 50 mol %, in some cases up to 47.5 mol %, typically up to 45 mol %, and, in some cases, up to 40 mol % of the total monomer composition. The level of the acrylic acceptor monomers used is determined by the properties that are to be incorporated into the copolymer composition. The acrylic acceptor monomers may be present in the monomer composition in any range of values inclusive of those stated above.

The ethylenically unsaturated monomer composition of the present method may include other donor monomers as described above, as well as other monomers designated by M and described above. The use of other mild acceptor monomers is optional in the present method. When other mild acceptor monomers are present, they are present at a level of at least 0.01 mol % of the copolymer composition, often at least 0.1 mol. %, typically at least 1 mol %, and, in some cases, at least 2 mol % of the total monomer composition. The other acceptor monomers may be present at up to 35 mol %, in some cases up to 25 mol %, typically up to 15 mol %, and, in some cases, up to 10 mol % of the total monomer composition. The level of other acceptor monomers used herein is determined by the properties that are to be incorporated into the copolymer composition. Residues from the other acceptor monomers may be present in the copolymer composition in any range of values inclusive of those stated above.

The use of other monomers M is optional in the present method. When other monomers are present, they are present at a level of at least 0.01 mold of the copolymer composition, often at least 0.1 mol %, typically at least 1 mol %, and, in some cases, at least 2 mol %. The other monomers may be present at up to 35 mol %, in some cases up to 25 mol %, typically up to 15 mol %, and, in some cases, up to 10 mol %. The level of other monomers used herein is determined by the properties that are to be incorporated into the copolymer composition. Residues from the other monomers M may-be present in the copolymer composition in any range of values inclusive of those stated above.

In an embodiment of the present method, an excess of monomer of structure I is used and the unreacted monomer of structure I is removed from the resulting copolymer composition by evaporation. The removal of unreacted monomer is typically facilitated by the application of a vacuum to the reaction vessel.

Any suitable free radical initiator may be used in the present invention. Examples of suitable free radical initiators include, but are not limited to, thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride, and 2-(carbamoylazo)-isobutyronitrile.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some case up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing or during addition and mixing, polymerization of the monomers takes place. The present polymerization method can be run at any suitable temperature. Suitable temperature for the present method may be ambient, at least 50° C., in many cases at least 60° C., typically at least 75° C., and, in some cases, at least 100° C. Suitable temperature for the present method may further be described as being up to 300° C., in many cases up to 275° C., typically up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The present polymerization method can be run at any suitable pressure. A suitable pressure for the present method may be ambient, at least 1 psi, in many cases at least 5 psi, typically at least 15 psi, and, in some cases, at least 20 psi. Suitable pressures for the present method may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization may vary in any range of values inclusive of those stated above.

The copolymer that results from the present method may be utilized as a starting material for the preparation of other polymers by using functional group transformations by methods known in the art. Functional groups that can be introduced by these methods are epoxy, carboxylic acid, hydroxy, amide, oxazoline, isocyanate, capped isocyanate, carbamate amine, thiol, aceto acetate, methylol, methylol ether, and beta-hydroxyalkylamide.

For example, a copolymer of the present method comprising methyl acrylate will contain carbomethoxy groups. The carbomethoxy groups can be hydrolyzed to carboxyl groups, or transesterified with an alcohol to form the corresponding ester of the alcohol. Using ammonia, the aforementioned methyl acrylate copolymer can be converted to an amide, or, using a primary or secondary amine, can be converted to the corresponding N-substituted amide. Similarly, using a diamine such as ethylene diamine, one can convert the aforementioned copolymer of the present method to an N-aminoethylamide, or, with ethanolamine, to an N-hydroxyethylamide. The N-aminoethylamide functionality can be further converted to an oxazoline by dehydration. The N-aminoethylamide can be further reacted with a carbonate, such as propylene carbonate, to produce the corresponding urethane functional copolymer. These transformations can be carried out to convert all of the carbomethoxy groups, or can be carried out in part, leaving some of the carbomethoxy groups intact.

Typically, in the present thermosetting composition, the functional groups of the film-forming material are selected from epoxy, carboxylic acid, hydroxy, amide, oxazoline, isocyanate, capped isocyanate, carbamate, amine, thiol, aceto acetate, methylol, methylol ether, and beta-hydroxyalkylamide. Typically, the functional groups of the crosslinking agent are selected from epoxy, carboxylic acid, hydroxy, amide, oxazoline, aceto acetate, methylol, methylol ether, isocyanate, capped isocyanate, carbamate, beta-hydroxyalkylamide, and thiol. The functional groups of the film-forming material are reactive with those in the crosslinking agent.

As a non-limiting example, the crosslinking agent may have epoxy functional groups. A non-limiting example of an epoxy functional crosslinking agent is a condensation polymer that includes residues from adducts having the structural formula X,

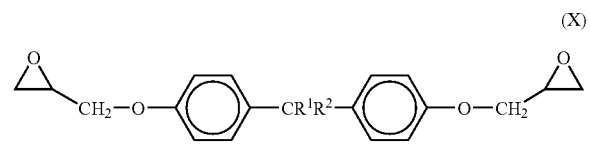

where $R^1$ and $R^2$ are independently selected from hydrogen and $C_1$–$C_3$ alkyl.

In an embodiment of the present invention, the copolymer in the film-forming material includes residues of one or more carboxylic acid functional monomers, and the crosslinking agent contains two or more epoxy groups. In a further embodiment of the present invention, the carboxylic acid functional acrylic monomer in the copolymer of the film-forming material is acrylic acid.

In another embodiment of the present invention, the copolymer in the film-forming material has at least two functional groups that are reactive with the functional groups in the crosslinking agent and includes at least 30 mol % of the residues having the alternating structural units:

-[DM-AM]- as defined above, where the donor monomer is selected from isobutylene, diisobutylene, dipentene, 1-octene, isoprene, and mixtures thereof, and the acrylic acceptor monomer is selected from acrylic acid and methacrylic acid.

In another embodiment of the present invention the thermosetting composition is a co-reactable solid, particulate mixture, or powder. The thermosetting composition includes a film-forming material including functional groups and a crosslinking agent having functional groups that are reactive with the functional groups in the film-forming material. In the powder thermosetting composition, the film-forming material includes a copolymer that may have functional groups selected from epoxy, carboxylic acid, hydroxy, amide, oxazoline, isocyanate, capped isocyanate, carbamate, amine, thiol, aceto acetate, methylol, methylol ether, and beta-hydroxyalkylamide. The functional groups of the crosslinking agent may be one or more of epoxy, carboxylic acid, hydroxy, amide, oxazoline, aceto acetate, methylol, methylol ether, isocyanate, carbamate, beta-hydroxyalkylamide, and thiol. The functional groups of the crosslinking agent will react with the functional groups in the film-forming material.

The functional copolymer in the film-forming material typically has a functional group equivalent weight of from 100 to 5,000 grams/equivalent, and the equivalent ratio, of film-forming material functional groups to crosslinking agent functional groups is within the range of 1:3 to 3:1. Typically, the crosslinking agent is present in an amount of from 5 to 80 percent by weight, based on total weight of resin solids, and the film-forming material is present in an amount of from 20 to 95 percent by weight, based on total weight of resin solids.

In an embodiment of the present powder thermosetting composition, the film-forming material includes the alternating copolymer described above, that includes residues of acrylate monomers, methacrylate monomers and/or mixtures thereof, and further includes functional groups. When the film-forming material includes a copolymer, the copolymer may have a number average molecular weight of from 500 to 16,000 and a polydispersity index of less than 4. Further, when the film-forming material includes a polymer, the polymer may have a functional group equivalent weight of from 100 to 5,000 grams/equivalent.

In an embodiment of the present powder thermosetting composition, the crosslinking agent may include a polymer. The polymer in the crosslinking agent may have a number average molecular weight of from 200 to 16,000 and a polydispersity index of less than 4. Further, the polymer in the crosslinking agent may have a functional group equivalent weight of from 50 to 5,000 grams/equivalent.

When the functional groups of the copolymer in the film-forming material are hydroxy functional groups and the functional group in the crosslinking agent are a capped polyisocyanate, the capping group of the capped polyisocyanate crosslinking agent may be one or more of hydroxy functional compounds, 1H-azoles, lactams, and ketoximes. The capping group is one or more of phenol, p-hydroxy methylbenzoate, 1H-1,2,4-triazole, 1H-2,5-dimethyl pyrazole, 2-propanone oxime, 2-butanone oxime, cyclohexanone oxime, and e-caprolactam. The polyisocyanate of the capped polyisocyanate crosslinking agent is one or more of 1,6-hexamethylene diisocyanate, cyclohexane diisocyanate, α,α'-xylylene diisocyanate, α,α,α',α'-tetramethylxylylene diisocyanate, 1-isocyanato-3,3,5-trimethyl-5-isocyanatomethylcyclohexane, 2,4,4-trimethyl hexamethylene diisocyanate, 2,2,4-trimethyl hexamethylene diisocyanate, diisocyanato-dicyclohexylmethane, dimers of said polyisocyanates, and trimers of the polyisocyanates. The copolymer having hydroxy functional groups typically has a hydroxy equivalent weight of from 100 to 10,000 grams/equivalent.

In another embodiment of the present powder thermosetting composition, the functional groups of the film-forming material are epoxy functional groups and the crosslinking agent has carboxylic functional groups.

In an embodiment of the present invention, when the crosslinking agent includes a polymer as described above having carboxylic functional groups, the thermosetting composition may include other suitable carboxylic crosslinking agents. In this embodiment, suitable other carboxylic acid crosslinking agents include, but are not limited to, one or more of $C_4$ to $C_{20}$ aliphatic carboxylic acids, polymeric polyanhydrides, carboxylic acid functional polyesters, carboxylic acid functional polyurethanes, and mixtures thereof. Suitable $C_4$ to $C_{20}$ aliphatic carboxylic acids include, but are not limited to, one or more of dodecanedioic acid, azelaic acid, adipic acid, 1,6-hexanedioic acid, succinic acid, pimelic acid, sebacic acid, maleic acid, citric acid, itaconic acid, aconitic acid, and mixtures thereof.

In a further embodiment of the powder thermosetting composition, the functional groups of the copolymer in the film-forming material are carboxylic functional groups, and the crosslinking agent includes a beta-hydroxyalkylamide. The beta-hydroxyalkylamide is typically one represented by structure VIII:

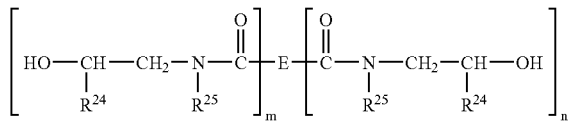

(VIII)

where $R^{24}$ is H or $C_1$–$C_5$ alkyl; $R^{25}$ is H, $C_1$–$C_5$ alkyl, or a group having structure IX:

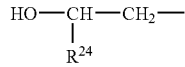

(IX)

for which $R^{24}$ is as described above, E is a chemical bond or monovalent or polyvalent organic radical derived from saturated, unsaturated, or aromatic hydrocarbon radicals including substituted hydrocarbon radicals containing from 2 to 20 carbon atoms; m is 1 or 2; n is from 0 to 2; and m+n is at least 2.

The powder thermosetting composition of the present invention may also include one or more cure catalysts for catalyzing the reaction between the crosslinking agent and the functional copolymer. Classes of useful catalysts include metal compounds, in particular, organic tin compounds, and tertiary amines. Examples of organic tin compounds include, but are not limited to, tin(II) salts of carboxylic acids, e.g., tin(II) acetate, tin(II) octanoate, tin(II) ethylhexanoate and tin(II) laurate; tin(IV) compounds, e.g., dibutyltin oxide, dibutyltin dichloride, dibutyltin diacetate, dibutyltin dilaurate, dibutyltin maleate, and dioctyltin diacetate. Examples of suitable tertiary amine catalysts include, but are not limited to, dimethyl lauryl amine, diazabicyclo[2.2.2]octane and 1,5-diazabicyclo[4,3,0]non-5-ene. Preferred catalysts include dimethyl lauryl amine and dibutyltin(IV) dilaurate.

The powder thermosetting composition of the present invention may also include pigments and fillers. Examples of pigments include, but are not limited to, inorganic pigments, e.g., titanium dioxide and iron oxides, organic pigments, e.g., phthalocyanines, anthraquinones, quinacridones and thioindigos, and carbon blacks. Examples of fillers include, but are not limited to, silica, e.g., precipitated silicas, clay, aluminum hydroxide, and barium sulfate. When used in the composition of the present invention, pigments and fillers are typically present in amounts of from 0.1 percent to 70 percent by weight, based on total weight of the thermosetting composition.

The powder thermosetting composition of the present invention may optionally contain additives such as waxes for flow and wetting, flow control agents, e.g., poly(2-ethylhexyl)acrylate, degassing additives such as benzoin, adjuvant resin to modify and optimize coating properties, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of the thermosetting composition.

The powder thermosetting composition of the present invention is typically prepared by first dry blending the film-forming polymer, the crosslinking agent, and additives, such as flow control agents, degassing agents, and catalysts, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range of 80° C. to 140° C., e.g., from 100° C. to 125° C. The extrudate of the thermosetting composition of the present invention is cooled and, when used as a powder coating composition, is typically milled to an average particle size of from, for example, 30 to 40 microns.

The present invention is also directed to a method of coating a substrate, which includes the steps of:
(A) applying a thermosetting composition to the substrate;
(B) coalescing the thermosetting composition to form a substantially continuous thin film; and
(C) curing the thermosetting composition.

The thermosetting composition is typically the powder thermosetting composition described above. The thermosetting composition includes the film-forming material including a copolymer of the present invention, which includes a functional copolymer as previously described, and a crosslinking agent having at least two functional groups that are reactive with the functional groups of the functional copolymer crosslinking agent.

The thermosetting composition of the present invention may be applied to the substrate by any appropriate means that are known to those of ordinary skill in the art. Generally, the thermosetting composition is in the form of a dry powder and is applied by spray application. Alternatively, the powder can be slurried in a liquid medium, such as water, and spray applied. Where the language "co-reactable solid, particulate mixture" is used in the specification and claims, the thermosetting composition can be in dry powder form or in the form of a slurry.

When the substrate is electrically conductive, the thermosetting composition is typically electrostatically applied. Electrostatic spray application generally involves drawing the thermosetting composition from a fluidized bed and propelling it through a corona field. The particles of the thermosetting composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited composition to a maximum of 3 to 6 mils (75 to 150 microns).

Alternatively, when the substrate is not electrically conductive, for example as is the case with many plastic substrates, the substrate is typically preheated prior to application of the thermosetting composition. The preheated temperature of the substrate is equal to or greater than that of the melting point of the thermosetting composition, but less than its cure temperature. With spray application over preheated substrates, film builds of the thermosetting composition in excess of 0.6 mils (150 microns) can be achieved, e.g., 10 to 20 mils (254 to 508 microns).

After application to the substrate, the thermosetting composition is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three dimensional crosslink network formed by covalent bond formation, e.g., between the reactive functional groups of the film-forming material and the crosslinking agent. The temperature at which the thermosetting composition of the present invention cures is variable and depends in part on the type and amount of catalyst used. Typically, the thermosetting composition has a cure temperature within the range of 100° C. to 204° C., e.g., from 160° C. to 195° C.

The thermosetting compositions described above can be applied to various substrates to which they adhere, including wood; metals, such as ferrous substrates and aluminum-substrates; glass; plastic, and sheet molding compound based plastics.

The present invention is further directed to a multi-component composite coating composition that includes:

(a) a base coat deposited from a pigmented film-forming composition; and (b) a transparent top coat applied over the base coat, where either the base coat or the transparent top coat or both are deposited from a clear film-forming thermosetting composition including the present thermosetting composition. The multi-component composite coating composition as described herein is commonly referred to as a color-plus-clear coating composition.

The base coat may be deposited from a powder coating composition as described above or from a liquid thermosetting composition. When the base coat is deposited from a liquid thermosetting composition, the composition is allowed to coalesce to form a substantially continuous film on the substrate. Typically, the film thickness will be about 0.0 1 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air-drying period. Preferably, the heating will only be for a short period of time, sufficient to ensure that any subsequently applied coatings can be applied to the film without dissolving the composition. Suitable drying conditions will depend on the particular composition but, in general, a drying time of from about 1 to 5 minutes at a temperature of about 68–250° F. 20–121° C.) will be adequate. More than one coat of the composition may be applied to develop the optimum appearance. Between coats, the previously applied coat may be flashed, that is, exposed to ambient conditions for about 1 to 20 minutes.

After application to the substrate, the liquid thermosetting composition, when used as the base coat, is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three-dimensional crosslink network formed by covalent bond formation, e.g., between the epoxy groups of the crosslinking agent and the carboxylic acid groups of the copolymer. The temperature at which the thermosetting composition of the present invention cures is variable and depends in part on the type and amount of catalyst used. Typically, the thermosetting composition has a cure temperature within the range of 130° C. to 160° C., e.g., from 140° C. to 150° C.

The pigmented film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, polyurethanes, and the copolymer composition of the present invention.

The resinous binders for the pigmented film-forming base coat composition can be organic solvent-based materials, such as those described in U.S. Pat. No. 4,220,679, note column 2, line 24 through column 4, line 40. Also, water-based coating compositions such as those described in U.S. Pat. Nos. 4,403,003, 4,147,679, and 5,071,904 can be used as the binder in the pigmented film-forming composition.

The pigmented film-forming base coat composition is colored and may also contain metallic pigments. Examples of suitable pigments can be found in U.S. Pat. Nos. 4,220,679, 4,403,003, 4,147,679; and 5,071,904.

Ingredients that may be optionally present in the pigmented film-forming base coat composition are those which are well-known in the art of formulating surface coatings, and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147,679, and 5,071,904.

The pigmented film-forming base coat composition can be applied to the substrate by any of the conventional coating techniques, such as brushing, spraying, dipping, or flowing, but are most often applied by spraying. The usual spray techniques and equipment for air spraying, airless spraying, and electrostatic spraying employing either manual or automatic methods can be used. The pigmented film-forming composition is applied in an amount sufficient to provide a base coat having a film thickness typically of 0.1 to 5 mils (2.5 to 125 microns) and preferably 0.1 to 2 mils (2.5 to 50 microns).

After deposition of the pigmented film-forming base coat composition onto the substrate, and prior to application of the transparent top coat, the base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The transparent top coat may be deposited from the thermosetting powder coating composition as described above or from a liquid thermosetting composition. The transparent top coat is applied over the deposited base coat by any of the methods by which coatings are known to be applied. In an embodiment of the present invention, the transparent top coat is applied by electrostatic spray application as described previously herein. When the transparent top coat is applied over a deposited base coat that has been dried, the two coatings can be co-cured to form the multi-component composite coating composition of the present invention. Both the base coat and top coat are heated together to conjointly cure the two layers. Typically, curing conditions of 130° C. to 160° C. for a period of 20 to 30 minutes are employed. The transparent top coat, when applied from a thermosetting liquid composition, typically has a thickness within the range of 0.5 to 6 mils (13 to 150 microns), e.g., from 1 to 3 mils (25 to 75 microns).

The present invention is more particularly described in the following examples, which are intended to be illustrative only, since numerous modifications and variations therein will be apparent to those skilled in the art. Unless otherwise specified, all parts and percentages are by weight.

EXAMPLE 1

Synthesis of an alternating copolymer of diisobutylene and acrylic acid/butyl acrylate.

The following ingredients were used in the polymerization:

|  | Ingredients | Parts by weight (grams) |
| --- | --- | --- |
| Charge 1 | Diisobutylene | 3136 |
|  | Dowanol PM[1] | 500 |
| Charge 2 | t-Amylperoxy(2-ethyl hexanoate)[2] | 196 |
| Charge 3 | Acrylic acid | 633.6 |
|  | Butyl Acrylate | 665.6 |

[1]1-methoxy-2-propanol, available from Dow Chemical Company, Midland, MI.
[2]Luperox 575, available from Atofina Chemicals, Inc., Philadelphia, PA Charge 1 was added to a reaction flask equipped with an agitator, a thermocouple, and a nitrogen inlet. The solution was placed under a nitrogen blanket and heated to 103° C. Charge 2 was then added to the reactor over a 4-hour period. Fifteen minutes after the Charge 2 addition was begun, Charge 3 was added to the reactor over a 4-hour period. During the monomer addition, the temperature in the reactor was maintained at 103° C. After Charges 2 and 3 were added, the reaction mixture was held for 2 hours. The reactor was then cooled to 25° C. Gas chromatography analysis of the reaction mixture showed that all of the acrylates were reacted. The reaction flask was then equipped for simple vacuum distillation and the reaction mixture heated to 80° C. to remove the unreacted diisobutylene and solvent. The solids of the resulting polymer were determined to be 99.58 wt. %, determined at 110° C. for one hour. The copolymer had a number average molecular weight $Mn=1574$ and polydispersity (PDI) $Mw/Mn=2.1$ (determined by gel permeation chromatography using polystyrene standards). The acid value of the powder was 223.88.

EXAMPLE 2

Synthesis of an alternating copolymer of diisobutylene and acrylic acid/butyl acrylate/isobornyl acrylate. The following ingredients were used in the polymerization:

|  | Ingredients | Parts by weight (grams) |
| --- | --- | --- |
| Charge 1 | Diisobutylene | 1568 |
|  | Dowanol PM | 200 |
| Charge 2 | t-Amylperoxy(2-ethyl hexanoate) | 24.5 |
| Charge 3 | Acrylic acid | 158.4 |
|  | Butyl Acrylate | 332.8 |
|  | Isobornyl Acrylate | 158.4 |

Charge 1 was added to a reaction flask equipped with an agitator, a thermocouple, and a nitrogen inlet. The solution was placed under a nitrogen blanket and heated to 103° C. Charge 2 was then added to the reactor over a 4-hour period. Fifteen minutes after the Charge 2 addition was begun, Charge 3 was added to the reactor over a 4-hour period. During the monomer addition, the temperature in the reactor was maintained at 103° C. After Charges 2 and 3 were added, the reaction mixture was held for 2 hours. The reactor was then cooled to 25° C. Gas chromatography analysis of the reaction mixture showed that all of the acrylates and were reacted. The reaction flask was then equipped for simple vacuum distillation and the reaction mixture heated to 80° C. to remove the unreacted diisobutylene and solvent. The solids of the resulting polymer were determined to be 99.40 wt. % determined at 110° C. for one hour. The copolymer had $Mn=1600$ and $Mw/Mn=5.0$ (determined by gel permeation chromatography using polystyrene as a standard). The acid value of the powder was 121.29 g/equiv.

EXAMPLE 3

Powder coating compositions were prepared using the components and amounts (in grams) shown below, and processed in the following manner. The components were blended in a Prism Blender for 15 to 30 seconds. The mixtures were then extruded through a Werner & Pfleider co-rotating twin screw extruder at a 450 RPM screw speed and an extrudate temperature of 100° C. to 1250° C. The extruded material was cooled to room temperature and then ground to a median particle size of 30 to 50 microns using an ACM Grinder (Air Classifying Mill from Micron Powder Systems, Summit, N.J.). Cold rolled steel test panels pretreated with Bonderite 1000 were obtained from ACT Laboratories. The finished powders were electrostatically sprayed onto test panels and baked for 20 minutes at 380° F. (193° C.). 60° gloss was measured with a Haze-gloss Reflectometer Model 4601 available from BYK-Gardner.

The following examples demonstrate how gloss varies as a function of the difference in solubility parameters between a carboxylic acid functional film-forming copolymer and a crosslinking agent.

| Material | A | B |
| --- | --- | --- |
| Resin of Example 1 | 60.5 | 139.4 |
| Epon 2002[3] | 154.9 |  |
| Almatex PD 9060[4] |  | 200.0 |
| Ti Pure R-706[5] | 217.2 | 200.0 |
| Resiflow PL 200[6] | 5.0 | 5.0 |
| Benzoin[7] | 1.4 | 3.9 |

-continued

| Material | A | B |
|---|---|---|
| Actiron 32-057[8] | 2.1 | 0.5 |
| Joncryl 819[9] | 19.4 | |
| Total | 460.5 | 548.8 |
| 60° Gloss | 7.3 | 76.2 |
| $\delta_{epoxy}$ | 22.22 | 16.99 |
| ($\delta_{epoxy} - \delta_{resin}$) | 3.6 | 1.63 |

[3]Bisphenol A epoxy, equivalent weight 720 g/epoxide, commercially available from Resolution Performance Products
[4]40% GMA acrylic, commercially available from Anderson Development
[5]Titanium dioxide pigment, commercially available from DuPont
[6]Acrylic flow aid/silica mix, commercially available from Estron Chemical
[7]Degasser
[8]Catalyst, dimethyl lauryl amine on silica, commercially available from Synthron
[9]Acid functional acrylic, commercially available from Johnson Polymer
$\delta_{epoxy}$ - solubility parameter for the epoxy functional crosslinking agent
($\delta_{epoxy} - \delta_{resin}$) - difference in solubility parameter between the crosslinking agent and the resin.

FIG. 1 is a photograph taken using a scanning electron microscope of a cross section of A, which clearly shows the bicontinuous morphology of the coating (dark and light portions representing different phases). FIG. 2 is a photograph taken using a scanning electron microscope of a cross section of B, which is homogenous. The data demonstrate, that a coating having a bicontinuous morphology, as in the present invention, is low gloss.

EXAMPLE 4

In the following examples, the gloss was modified by blending a standard polyester/epoxy hybrid system with increasing amounts of the resin of Example 2.

| Material | C | D | E | F |
|---|---|---|---|---|
| Polyester[10] | 180.3 | 135.2 | 90.2 | |
| Epon 2002 | 138.6 | 138.6 | 138.6 | 138.6 |
| Joncryl 819 | 17.4 | 17.4 | 17.4 | 17.4 |
| Resin of Example 2 | | 18.6 | 37.3 | 74.6 |
| Vestagon BF 1540[11] | 13.8 | 13.8 | 13.8 | 13.8 |
| Benzoin | 1.2 | 1.2 | 1.2 | 1.2 |
| PL 200[12] | 4.5 | 4.5 | 4.5 | 4.5 |
| A–C Polyethylene 8A[13] | 1.2 | 1.2 | 1.2 | 1.2 |
| Actiron 32-057 | 1.9 | 1.9 | 1.9 | 1.9 |
| Ti Pure R-706 | 232.7 | 232.7 | 232.7 | 232.7 |
| Total | 591.6 | 565.1 | 538.7 | 485.8 |
| % acid equivalents from the Resin of Example 2 | 0% | 25% | 50% | 100% |
| 60° Gloss | 96.2 | 82.9 | 64.4 | 6.9 |

[10]Acid functional polyester, equivalent weight 1100 g/acid
[11]Uretadione-butanediol adduct, commercially available from Creanova
[12]Acrylic flow aid/silica mix, commercially available from Estron Chemical
[13]Polyethylene homopolymer, commercially available from AC Performance Additives The examples demonstrate the low gloss powder coating of the present invention, as well as the potential to provide a range of glosses in a powder coating by using two or more film-forming resins having different miscibilities with the crosslinking agent.

The present invention has been described with reference to specific details of particular embodiments thereof. It is not intended that such details be regarded as limitations upon the scope of the invention except insofar as and to the extent that they are included in the accompanying claims.

We claim:

1. A thermosetting protective and/or decorative coating composition comprising a co-reactable solid, particulate mixture of:
   (a) a film-forming material comprising a copolymer containing functional groups; and
   (b) a crosslinking agent having at least two functional groups that are reactive with the functional groups in the copolymer in (a), wherein (a) comprises from 20 to 95 wt. % and (b) comprises at least 5 to 80 wt. % of the combined weights of (a) and (b) and, wherein, when the composition is applied and cured as a coating, it forms a bicontinuous morphology where (a) and (b) form separate phases.

2. The composition of claim 1, wherein the miscibility of (a) with (b) is characterized by an interaction parameter, $\chi$, of the copolymer in (a) with the crosslinking agent (b) of greater than 0.5.

3. The composition of claim 1, wherein the miscibility of (a) with (b) is characterized by the difference between the solubility parameter, $\delta_a$, of the copolymer in (a) and the solubility parameter, $\delta_b$, of the crosslinking agent (b) ($\delta_a - \delta_b$) being greater than 2.

4. The composition of claim 1, wherein the copolymer in (a) comprises at least 30 mol % of residues having the following alternating structural units:

-[DM-AM]- wherein DM represents a residue from a donor monomer having the following structure (I):

(I)

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl, and AM represents a residue from one or more acrylic acceptor monomers.

5. The composition of claim 1, wherein the crosslinking agent (b) comprises a polymer.

6. The composition of claim 1, wherein the functional groups of the film-forming material (a) are selected from the group consisting of epoxy, carboxylic acid, hydroxy, amide, oxazoline, isocyanate, capped isocyanate, carbamate, amine, thiol, aceto acetate, methylol, methylol ether and beta-hydroxyalkylamide; the functional groups of the crosslinking agent (b) are selected from the group consisting of epoxy, carboxylic acid, hydroxy, amide, oxazoline, aceto acetate, methylol, methylol ether, isocyanate, capped isocyanate and carbamate, beta-hydroxyalkylamide and thiol; and wherein the functional groups of the film-forming material (a) are reactive with those in the crosslinking agent (b).

7. The composition of claim 2, wherein the copolymer in (a) comprises residues of one or more carboxylic acid functional monomers and the crosslinking agent (b) contains two or more epoxy groups.

8. The composition of claim 7, wherein the carboxylic acid functional monomers include acrylic acid.

9. The composition of claim 4, in which the donor monomer is selected from the group consisting of isobutylene, diisobutylene, isoprene, dipentene, 1-octene, and mixtures thereof.

10. The composition of claim 1, wherein the copolymer in (a) has a number average molecular weight of from 500 to 30,000 and a polydispersity index of less than 4.

11. The composition of claim 5, wherein the polymer in (b) has a number average molecular weight of from 200 to 30,000 and a polydispersity index of less than 4.

12. The composition of claim 1, wherein the copolymer in (a) has a functional group equivalent weight of from 100 to 5,000 grams/equivalent.

13. The composition of claim 5, wherein the polymer in (b) has a functional group equivalent weight of from 50 to 5,000 grams/equivalent.

14. The composition of claim 1, wherein the equivalent ratio of functional group equivalents in the copolymer of (a) to functional group equivalents in the crosslinking agent (b) is within the range of 1:3 to 3:1.

15. The composition of claim 1, wherein said crosslinking agent (b) is present in an amount of from 50 to 80 percent by weight, based on total weight of resin solids, and said film-forming material (a) is present in an amount of from 20 to 50 percent by weight, based on total weight of resin solids.

16. The composition of claim 4, wherein the acrylic acceptor monomers are one or more described by structure (III):

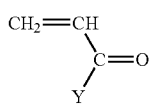

(III)

wherein Y is selected from the group consisting of $-NR^3{}_2$, $-O-R^5-O-C(=O)-NR^3{}_2$, and $-OR^4$, $R^3$ is selected from the group consisting of H, linear or branched $C_1$ to $C_{20}$ alkyl, aryl, alkaryl and aralkyl containing one or more functional groups selected from the group consisting of epoxy, carboxylic acid, hydroxy, amide, oxazoline, isocyanate, capped isocyanate, carbamate, amine, thiol, aceto acetate, methylol, methylol ether and beta-hydroxyalkylamide; $R^4$ is selected from the group consisting of H, linear or branched $C_1$ to $C_{20}$ alkyl, aryl, alkaryl and aralkyl containing one or more functional groups selected from the group consisting of epoxy, carboxylic acid, hydroxy, amide, oxalzoline, isocyanate, capped isocyanate, carbamate, amine, thiol, aceto acetate, methylol, methylol ether, and beta-hydroxyalkylamide; and $R^5$ is a divalent linear or branched $C_1$ to $C_{20}$ alkyl linking group.

17. The composition of claim 16, wherein the acrylic acceptor monomer is one or more selected from the group consisting of hydroxyethyl acrylate, hydroxypropyl acrylate, acrylic acid, dimethylaminoethyl acrylate, acrylamide, glycidyl acrylate, glycidyl methacrylate, allyl glycidyl ether, vinyl glycidyl ether, n-butoxy methyl acrylamide, hydroxyethyl methacrylate, hydroxypropyl methacrylate, methacrylic acid, methacrylamide, 2-carbamoyloxyethyl acrylate, 2-carbamoyloxyethyl methacrylate, 2-carbamyloyloxypropryl acrylate, 2-carbamyloyloxypropryl methacrylate, 2-isocyanatoethyl acrylate, 2-isocyanatoethyl methacrylate, 2-isocyanatopropyl acrylate, 2-isocyanatopropyl methacrylate, 2-oxazoline ethyl acrylate, 2-oxazoline ethyl methacrylate, 2-oxazoline propyl acrylate, 2-oxazoline propyl methacrylate, aceto acetate ester of hydroxyethyl acrylate, aceto acetate ester of hydroxyethyl methacrylate, aceto acetate ester of hydroxypropyl methacrylate, and aceto acetate ester of hydroxypropyl acrylate.

18. The composition of claim 5, wherein the polymer in the crosslinking agent (b) comprises epoxy functional groups.

19. The composition of claim 18, wherein the epoxy functional polymer is a condensation polymer comprising residues from adducts having the structural formula:

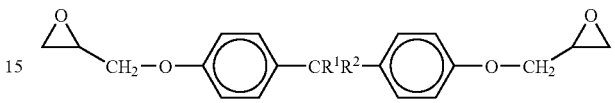

wherein $R^1$ and $R^2$ are independently selected from hydrogen and $C_1$–$C_3$ alkyl.

20. The composition of claim 1, wherein a cured coating layer deposited from the thermosetting composition, coated over at least a portion of a substrate, exhibits a specular gloss of not more than 10 gloss units when measured at 60° with a Byk-Gardner Haze-gloss Reflectometer.

21. The composition of claim 1, wherein the film-forming material (a) further comprises one or more other polymers containing functional groups.

22. A composition comprising a co-reactable solid, particulate mixture of:
(a) a film-forming material comprising a copolymer containing carboxylic acid functional groups comprised of at least 30 mol % of residues having the following alternating structural units:

-[DM-AM]- wherein DM represents a residue from a donor monomer selected from the group consisting of isobutylene, diisobutylene, dipentene, 1-octene, isoprene, and mixtures thereof; and AM represents a residue from one or more acrylic acceptor monomers selected from the group consisting of acrylic acid and methacrylic acid; and
(b) a crosslinking agent comprising a condensation polymer containing at least two epoxy functional groups that are reactive with the carboxylic acid functional groups in the copolymer in (a),
wherein a cured coating layer deposited from the thermosetting composition, coated over at least a portion of a substrate, exhibits a specular gloss of not more than 10 gloss units when measured at 60° with a Byk-Gardner Haze-gloss Reflectometer.

23. The composition of claim 22, wherein the polymer in (b) is a condensation polymer comprising residues from adducts having the structural formula:

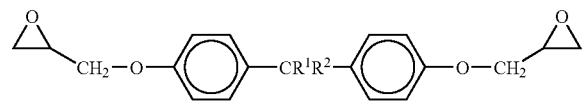

wherein $R^1$ and $R^2$ are independently selected from hydrogen and $C_1$–$C_3$ alkyl.

24. The composition of claim 22, wherein the interaction parameter, $\chi$, of the copolymer in (a) with the crosslinking agent (b) is greater than 0.5.

25. The composition of claim 22, wherein the difference between the solubility parameter, $\delta_a$, of the copolymer in (a) and the solubility parameter, $\delta_b$, of the crosslinking, agent (b) ($\delta_a-\delta_b$) is greater than 2.

26. The composition of claim 22, wherein (a) comprises from 20 to 95 wt. % and (b) comprises at least 5 to 80 wt. % of the combined weights of (a) and (b) and, wherein, when the composition is cured, it forms a bicontinuous morphology where (a) and (b) form separate phases.

27. A method of coating a substrate comprising:
    (A) applying the composition of claim 1 to the substrate;
    (B) coalescing the composition to form a substantially continuous, thin film; and
    (C) curing the composition.

28. A method of coating a substrate comprising:
    (A) applying the composition of claim 22 to the substrate;
    (B) coalescing the composition to form a substantially continuous, thin film; and
    (C) curing the composition.

29. A substrate coated using the method of claim 27.

30. A substrate coated using the method of claim 28.

31. A multi-component composite coating composition comprising:
    (a) a base coat deposited from a pigmented film-forming composition; and
    (b) a transparent top coat applied over the base coat, wherein either the base coat or the transparent top coat or both is deposited from the composition of claim 1.

32. A multi-component composite coating composition comprising:
    (a) a base coat deposited from a pigmented film-forming composition; and
    (b) a transparent top coat applied over the base coat, wherein either the base coat or the transparent top coat or both is deposited from the composition of claim 22.

33. A multi-component composite coating composition comprising:
    (a) a primer coat deposited by electrocoating a conductive substrate serving as a cathode in an electrical circuit comprising the cathode and an anode, the cathode and the anode being immersed in an aqueous electrocoating composition, by passing an electrical current between the cathode and the anode to cause deposition of the electrocoating composition on the substrate as a substantially continuous film;
    (b) a base coat applied over the primer coat, wherein the base coat is deposited from a pigmented film-forming composition; and
    (c) a transparent top coat applied over the base coat, wherein the base coat or the transparent top coat or both are deposited from the composition of claim 1.

34. A multi-component composite coating composition comprising:
    (a) a primer coat deposited by electrocoating a conductive substrate serving as a cathode in an electrical circuit comprising the cathode and an anode, the cathode and the anode being immersed in an aqueous electrocoating composition, by passing an electrical current between the cathode and the anode to cause deposition of the electrocoating composition on the substrate as a substantially continuous film;
    (b) a base coat applied over the primer coat, wherein the base coat is deposited from a pigmented film-forming composition; and
    (c) a transparent top coat applied over the base coat, wherein the base coat or the transparent top coat or both are deposited from the composition of claim 22.

35. A substrate coated with the multi-component composite coating composition of claim 31.

36. A substrate coated with the multi-component composite coating composition of claim 32.

37. A substrate coated with the multi-component composite coating composition of claim 33.

38. A substrate coated with the multi-component composite coating composition of claim 34.

* * * * *